(12) United States Patent
Rao et al.

(10) Patent No.: US 9,103,224 B2
(45) Date of Patent: Aug. 11, 2015

(54) COMPLIANT PLATE SEAL FOR USE WITH ROTATING MACHINES AND METHODS OF ASSEMBLING A ROTATING MACHINE

(75) Inventors: Ajay Keshava Rao, Bangalore (IN); Hrishikesh Vishvas Deo, Saratoga Springs, NY (US); Hemant Vinayak Gedam, Bangalore (IN); Vishwas Kumar Pandey, Ujjain (IN)

(73) Assignee: General Electric Company, Niskayuna, NY (US)

( * ) Notice: Subject to any disclaimer, the term of this patent is extended or adjusted under 35 U.S.C. 154(b) by 746 days.

(21) Appl. No.: 13/339,967

(22) Filed: Dec. 29, 2011

(65) Prior Publication Data

US 2013/0170965 A1 Jul. 4, 2013

(51) Int. Cl.
*F01D 11/02* (2006.01)
*F16J 15/32* (2006.01)
*F01D 11/00* (2006.01)

(52) U.S. Cl.
CPC ........... *F01D 11/003* (2013.01); *F16J 15/3292* (2013.01); *F05D 2240/57* (2013.01); *F05D 2240/59* (2013.01); *Y10T 29/49323* (2013.01)

(58) Field of Classification Search
USPC ............ 277/412, 416, 418; 415/170.1, 171.1, 415/174.5, 173.7, 173.5
See application file for complete search history.

(56) References Cited

U.S. PATENT DOCUMENTS

| | | | |
|---|---|---|---|
| 4,420,161 A * | 12/1983 | Miller | 415/174.5 |
| 5,704,614 A * | 1/1998 | Sanders et al. | 277/303 |
| 7,226,053 B2 | 6/2007 | Nakano et al. | |
| 7,419,164 B2 | 9/2008 | Awtar et al. | |
| 7,435,049 B2 | 10/2008 | Ghasripoor et al. | |
| 7,651,101 B2 | 1/2010 | Awtar et al. | |
| 7,703,774 B2 | 4/2010 | Awtar et al. | |
| 7,909,335 B2 | 3/2011 | Turnquist et al. | |
| 2005/0104300 A1 | 5/2005 | Hogg et al. | |
| 2006/0033285 A1 * | 2/2006 | Nishimoto et al. | 277/355 |
| 2008/0107525 A1 | 5/2008 | Adis et al. | |

(Continued)

FOREIGN PATENT DOCUMENTS

| CN | 1573024 A | 2/2005 |
|---|---|---|
| CN | 1704561 A | 12/2005 |

(Continued)

OTHER PUBLICATIONS

Search Report from corresponding GB Application No. GB1222682.5 dated Apr. 17, 2013.

Chinese Office Action issued in connection with corresponding CN Application No. 201210580689.0 on Apr. 28, 2015.

*Primary Examiner* — Richard Edgar
(74) *Attorney, Agent, or Firm* — Ann M. Agosti

(57) ABSTRACT

A sealing assembly for use with a rotating machine is described herein. The rotating machine includes a stator casing that includes a radially inner surface that defines a cavity therein, and a rotor positioned within the cavity and spaced inwardly from the stator inner surface. The sealing assembly includes a support ring coupled to the stator casing, and a plurality of plate members coupled to the support ring and oriented circumferentially about the rotor. A resistance member extends inwardly from the support ring towards the rotor outer surface. The resistance member is coupled to the support ring and extends through each plate member of the plurality of plate members. At least one rotor land is defined circumferentially about the rotor outer surface. Each plate member is oriented adjacent the at least one rotor land.

16 Claims, 7 Drawing Sheets

(56) References Cited

U.S. PATENT DOCUMENTS

| | | |
|---|---|---|
| 2008/0131269 A1* | 6/2008 | Deo et al. .................. 415/170.1 |
| 2009/0304493 A1 | 12/2009 | Awtar |
| 2010/0066024 A1 | 3/2010 | Burdgick et al. |
| 2010/0143102 A1 | 6/2010 | Deo et al. |
| 2010/0213675 A1 | 8/2010 | Adis et al. |

FOREIGN PATENT DOCUMENTS

| | | |
|---|---|---|
| EP | 1479952 A2 | 11/2004 |
| EP | 1900983 A1 | 3/2008 |
| EP | 2206938 A2 | 7/2010 |
| JP | 09287406 A | 11/1997 |

* cited by examiner

COMPLIANT PLATE SEAL FOR USE WITH ROTATING MACHINES AND METHODS OF ASSEMBLING A ROTATING MACHINE

BACKGROUND OF THE INVENTION

The subject matter described herein relates generally to rotating machines and more particularly, to a compliant plate seal and methods of assembling a rotating machine.

Dynamic sealing between a rotor (e.g., rotating shaft) and a stator (e.g., static shell or casing) is an important consideration in turbomachinery. Several methods of sealing have been used including sealing assemblies that include labyrinth teeth or flexible members such as brush seals.

At least some known brush seals include tightly-packed, generally cylindrical bristles that are oriented adjacent a rotor assembly and that are arranged in a staggered arrangement to reduce leakage. The bristles have a low radial stiffness that allow them to move in the event of a rotor excursion while maintaining a tight clearance during steady state operations. Brush seals, however, are generally effective only below a limited pressure differential across the seal. Because of the generally cylindrical geometry of the bristles, the brush seals tend to have a low stiffness in the axial direction, which limits the maximum operable pressure differential in known brush seals to generally less than 400 psi.

In addition, at least some known sealing assemblies include a plurality of labyrinth teeth that extend outwardly towards the rotor assembly. During operation of known turbomachines, vibrations caused by rotation of the rotor assembly cause the labyrinth teeth to contact the rotor assembly. Over time, the labyrinth teeth become worn, as such the sealing assembly becomes less effective which may shorten the useful life of the turbomachines.

BRIEF DESCRIPTION OF THE INVENTION

In one aspect, a sealing assembly for use with a rotating machine is provided. The rotating machine includes a stator casing that includes a radially inner surface that defines a cavity therein, and a rotor positioned within the cavity and spaced inwardly from the stator inner surface. The sealing assembly includes a support ring coupled to the stator casing, and a plurality of plate members coupled to the support ring and oriented circumferentially about the rotor. Each plate member of the plurality of plate members includes a root end and a tip end. The root end is coupled to the support ring, and the tip end extends outwardly from the root end towards an outer surface of the rotor. A resistance member extends inwardly from the support ring towards the rotor outer surface. The resistance member is coupled to the support ring and extends through each plate member of the plurality of plate members. At least one rotor land is defined circumferentially about the rotor outer surface. The tip end of each plate member of the plurality of plate members is oriented adjacent the at least one rotor land to form a tortuous sealing path between the rotor land and the plurality of plate members.

In another aspect, a rotating machine is described herein. The rotating machine includes a stator casing that includes a radially inner surface that defines a cavity therein. A rotor is coupled to the stator casing. The rotor includes a radially outer surface and is spaced inwardly from the stator inner surface. A sealing assembly is coupled to the stator casing and oriented between the stator casing and the rotor outer surface. The sealing assembly includes a support ring that is coupled to the stator casing, and a plurality of plate members coupled to the support ring and oriented circumferentially about the rotor outer surface. Each plate member of the plurality of plate members includes a root end and a tip end. The root end is coupled to the support ring. The tip end extends outwardly from the root end towards the rotor outer surface. A resistance member is coupled to the support ring and extends inwardly from the support ring towards the rotor outer surface. The resistance member extends through each plate member of the plurality of plate members. At least one rotor land is defined circumferentially about the rotor outer surface. The tip end of each plate member of the plurality of plate members is oriented adjacent the at least one rotor land to form a tortuous sealing path between the rotor land and the plurality of plate members.

In yet another aspect, a method of assembling a rotating machine is provided. The method includes providing a stator casing including a radially inner surface, and coupling a rotor to the stator casing such that the rotor is spaced inwardly from the stator inner surface. The rotor includes at least one rotor land defined circumferentially about an outer surface of the rotor. The method also includes coupling a support ring to the stator casing, coupling a resistance member to the support ring, and coupling a plurality of plate members to the support ring such that the plurality of plate members are oriented circumferentially about the rotor. The resistance member extends through each plate member of the plurality of plate members. Each plate member of the plurality of plate members includes a root end and a tip end extending outwardly from the root end towards the rotor. The tip end of each plate member of the plurality of plate members is oriented adjacent the at least one rotor land to form a tortuous sealing path between the rotor land and the plurality of plate members.

DETAILED DESCRIPTION OF THE INVENTION

The exemplary methods and systems described herein overcome at least some disadvantages of known turbomachines by providing a sealing assembly that includes a compliant plate seal assembly that forms a tortuous flow path between the compliant plate seal assembly and a rotor assembly to facilitate preventing leakage between the rotor assembly and the compliant plate seal assembly. More specifically, the seal assembly includes a plurality of rotor lands that are oriented circumferentially about an outer surface of the rotor assembly. The compliant plate seal assembly is oriented with respect to the plurality of rotor lands to facilitate forming the tortuous flow path.

In addition, known labyrinth seals include packing rings that are positioned within a groove that is defined along an inner surface of a stator casing. The sealing assembly described herein is configured to replace an existing labyrinth seal to improve sealing between a stator casing and the rotor assembly. More specifically, the sealing assembly includes a support ring that is configured to be inserted into the stator groove to facilitate coupling the compliant plate seal assembly to the stator casing. By providing a sealing assembly that includes a compliant plate seal assembly oriented with respect to a plurality of rotor lands, a leakage flow between the rotor assembly and the compliant plate seal assembly is reduced, thereby increasing an operating efficiency of the turbomachine.

As used herein, the term "upstream" refers to a forward or inlet end of a rotating machine, and the term "downstream" refers to an aft or discharge end of the rotating machine.

Figure 1:
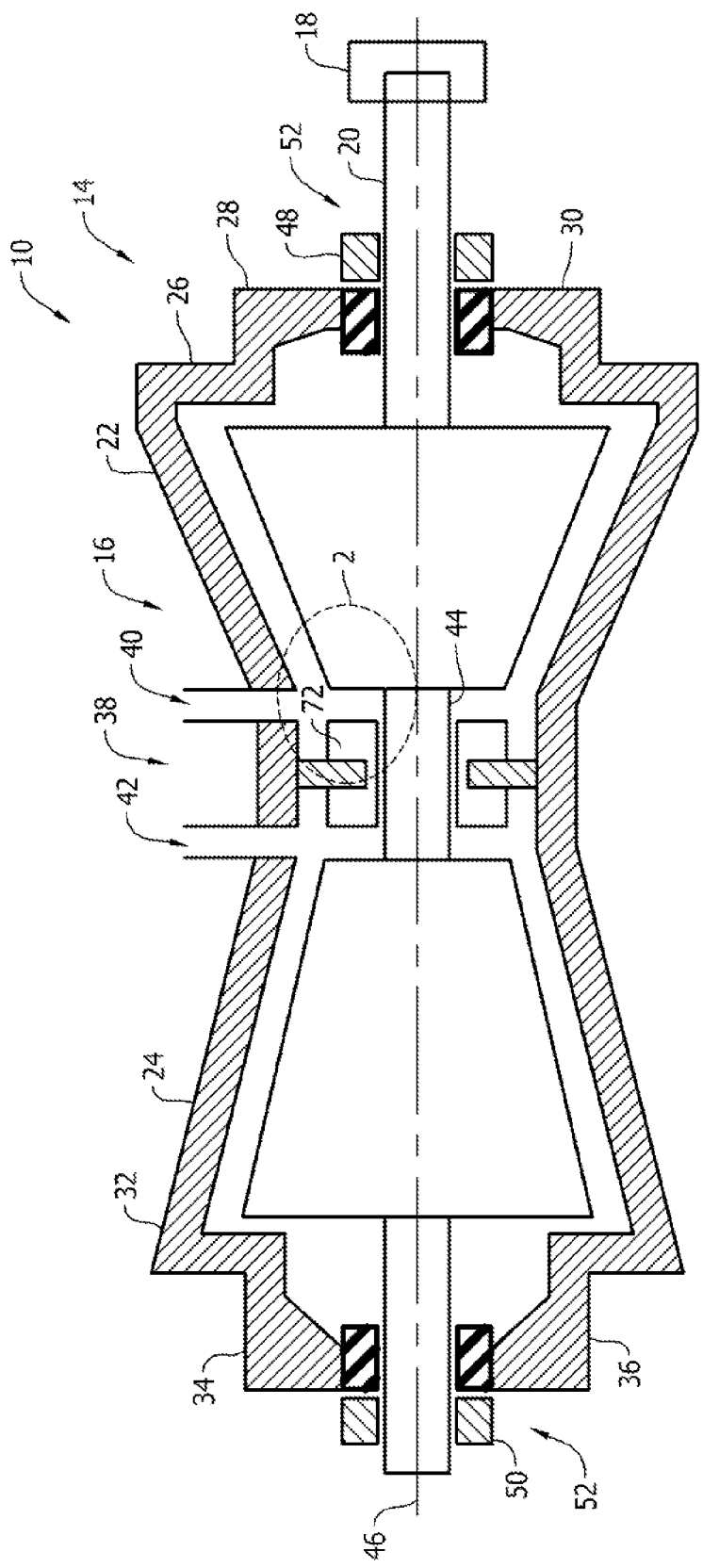
FIG. 1 is a schematic view of an exemplary rotating machine.
Figure 2:
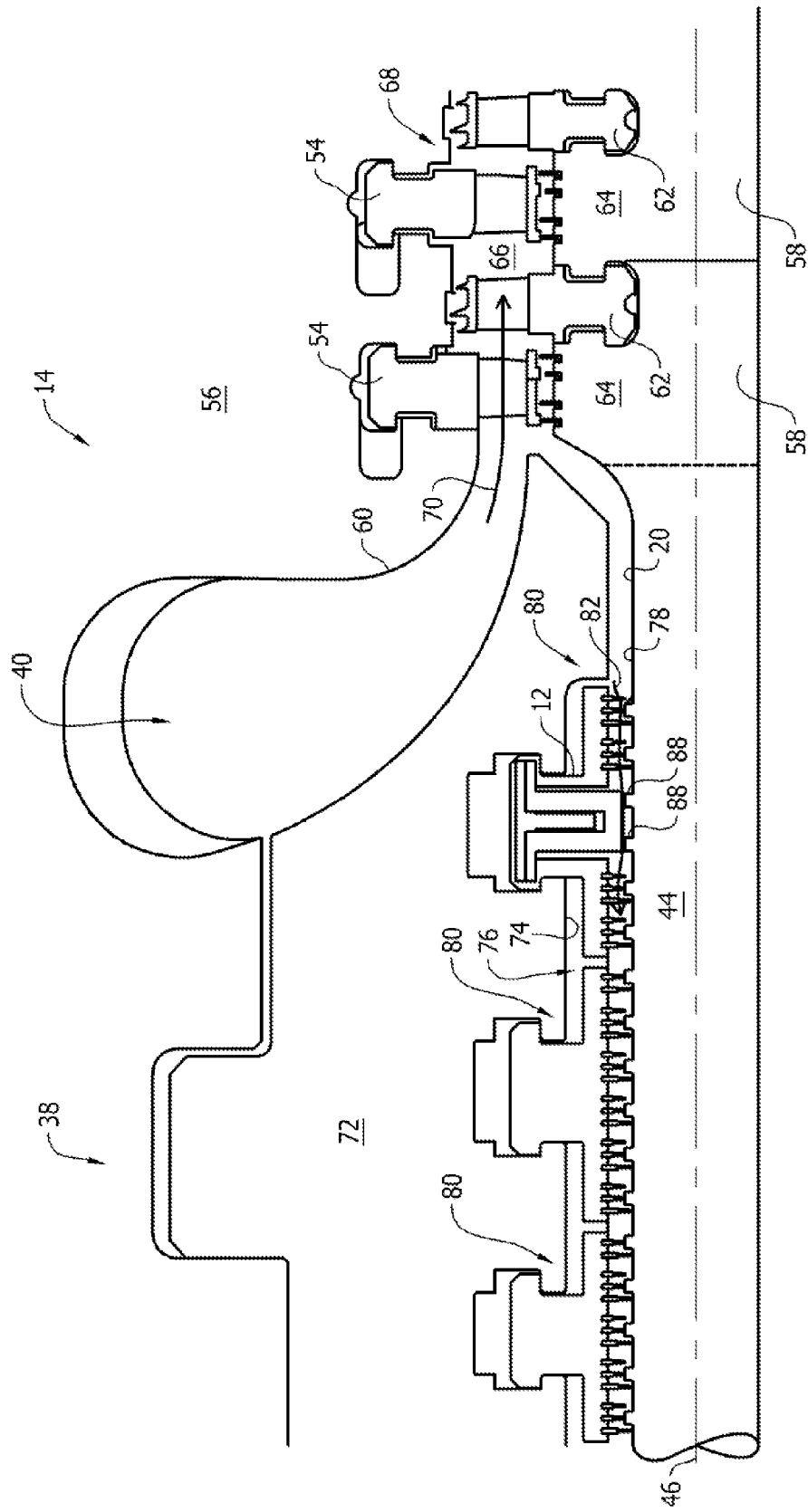
FIG. 2 is an enlarged sectional view of the rotating machine shown in FIG. 1 and taken along area 2 including an exemplary compliant plate seal assembly.
Figure 3:
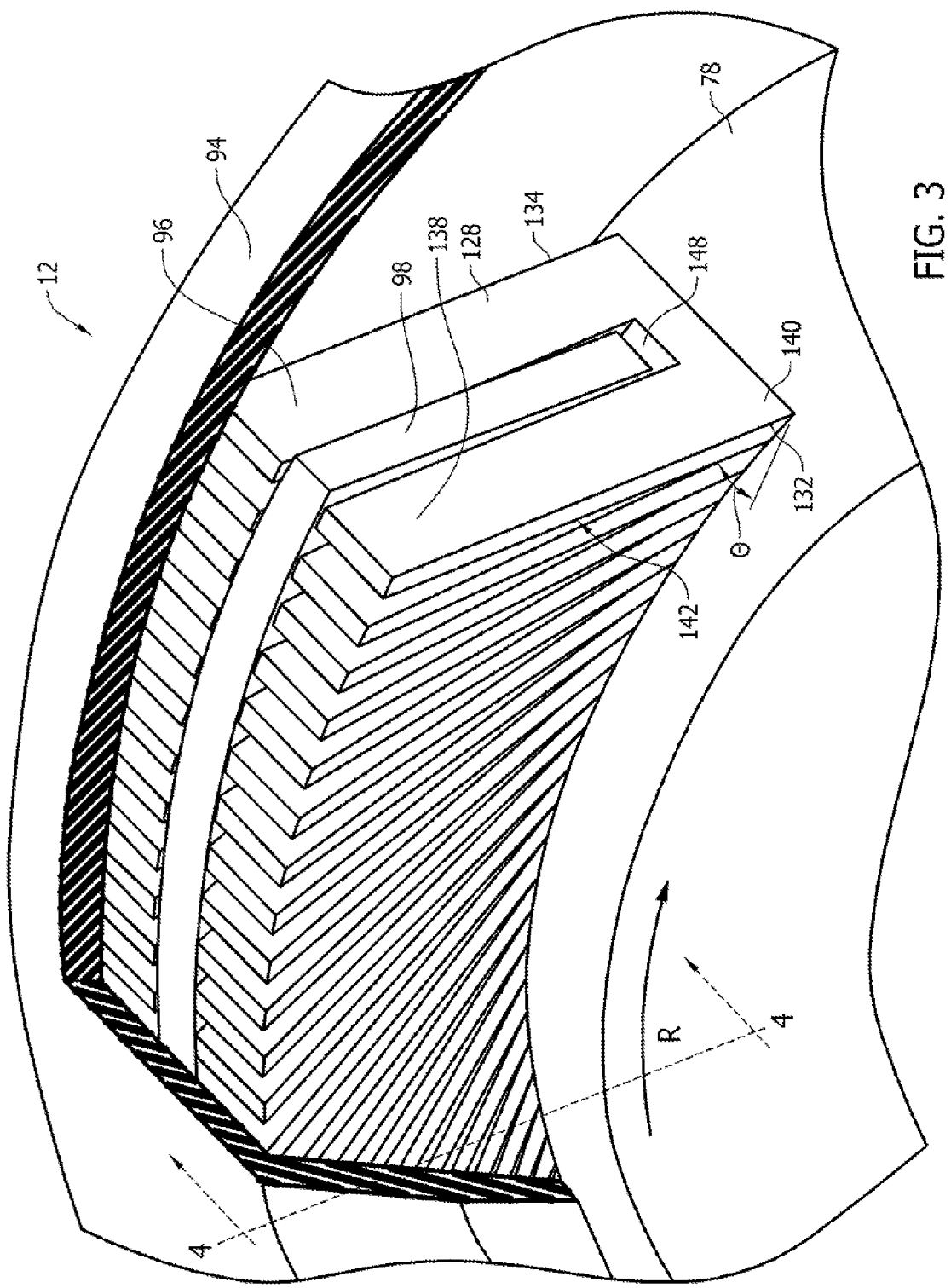
FIG. 3 is a partial perspective view of the compliant plate seal assembly shown in FIG. 2.
Figure 4:
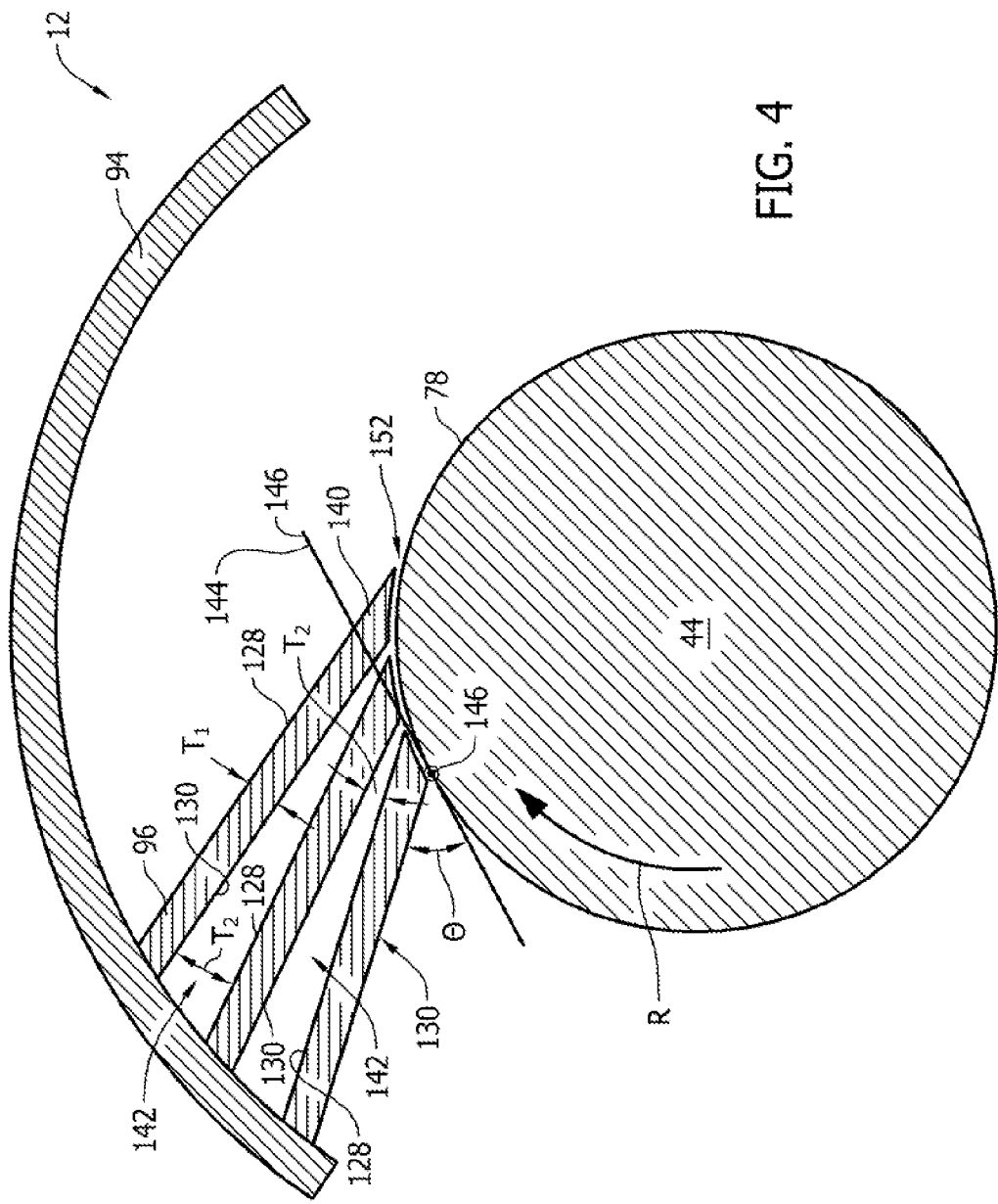
FIG. 4. is a partial section view of the compliant plate seal assembly shown in FIG. 3 and taken along line 4-4.
Figure 5:
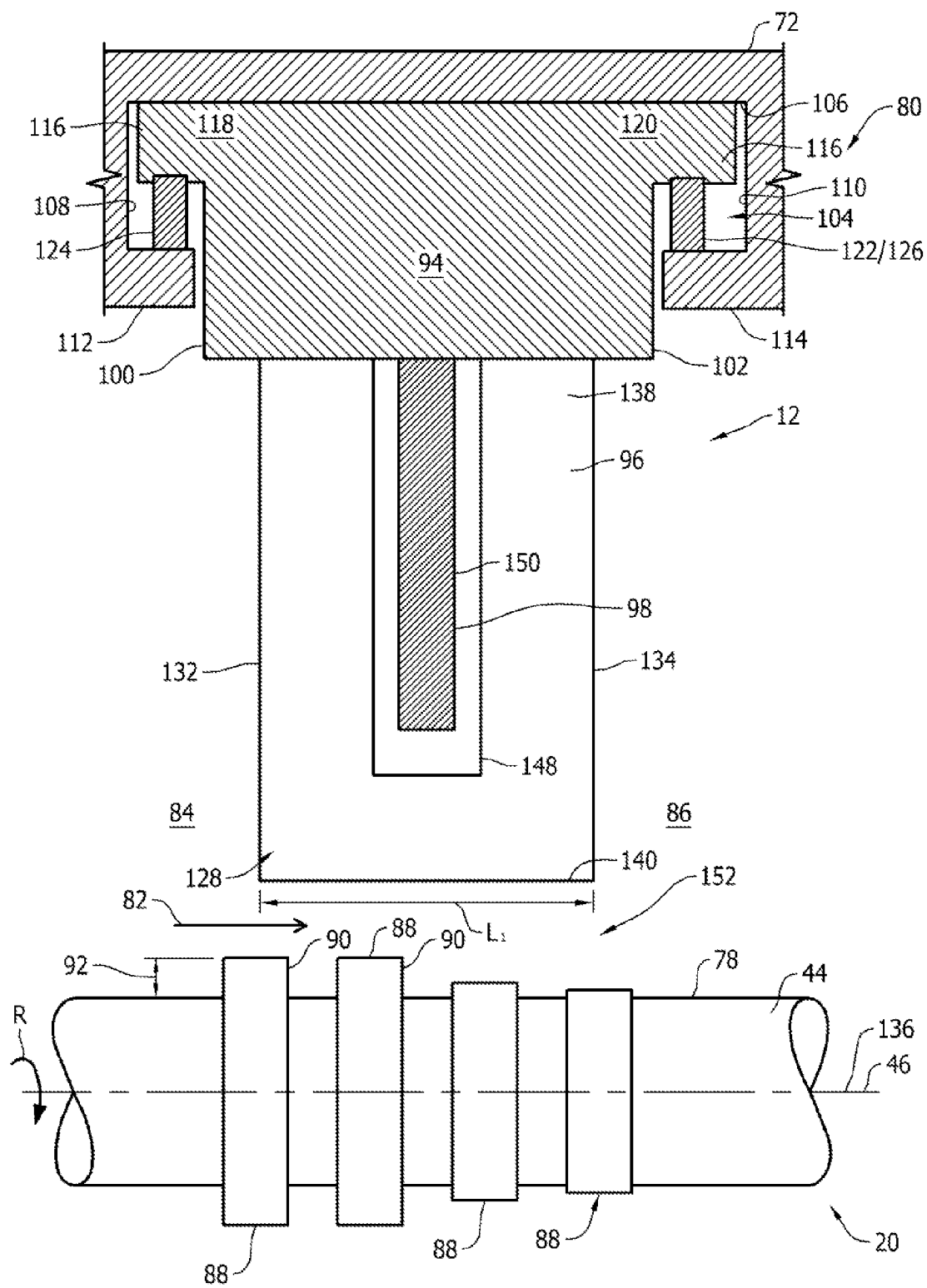
FIG. 5 is an enlarged sectional view of the compliant plate seal assembly shown in FIG. 2.

FIG. 1 is a schematic view of an exemplary turbomachine 10. FIG. 2 is an enlarged sectional view of turbomachine 10 taken along area 2 shown in FIG. 1. FIG. 3 is a partial perspective view of an exemplary compliant plate seal assembly 12. FIG. 4. is a partial section view of compliant plate seal assembly 12 taken along line 4-4 shown in FIG. 3. FIG. 5 is an enlarged sectional view of compliant plate seal assembly 12. In the exemplary embodiment, turbomachine 10 includes a turbine engine 14 including an opposed-flow high pressure and intermediate pressure steam turbine combination. Alternatively, turbomachine 10 may be any type of turbine engine 14 including, but not limited to only including a low pressure turbine, a single-flow steam turbine, a double-flow steam turbine, a gas turbine engine, an aircraft engine, a compressor and/or any other rotating device. In the exemplary embodiment, turbine engine 14 includes a turbine 16 that is coupled to a generator 18 via a rotor assembly 20. Moreover, in the exemplary embodiment, turbine 16 includes a high pressure (HP) section 22 and an intermediate pressure (IP) section 24. An HP casing 26 is divided axially into upper and lower half sections 28 and 30, respectively. Similarly, an IP casing 32 is divided axially into upper and lower half sections 34 and 36, respectively. A central section 38 extends between HP section 22 and IP section 24, and includes an HP steam inlet 40 and an IP steam inlet 42. Rotor assembly 20 extends between HP section 22 and IP section 24 and includes a rotor 44 that extends along a centerline axis 46 between HP section 22 and IP section 24. Rotor 44 is supported from casing 26 and 32 by journal bearings 48 and 50, respectively, that are each coupled to opposite end portions 52 of rotor 44.

In the exemplary embodiment, turbine engine 14 includes rotor assembly 20, a plurality of stationary nozzle assemblies 54, and a casing 56 that extends circumferentially about rotor assembly 20 and nozzle assemblies 54. Rotor assembly 20 includes a plurality of rotor disk assemblies 58 that are each aligned substantially axially between each adjacent pair of nozzle assemblies 54. Each nozzle assembly 54 is securely coupled to casing 56. More specifically, casing 56 includes a nozzle carrier 60 that extends radially inwardly from casing 56 towards rotor assembly 20. Each nozzle assembly 54 is coupled to nozzle carrier 60 to facilitate preventing a rotation of nozzle assembly 54 with respect to rotor assembly 20.

In the exemplary embodiment, each rotor disk assembly 58 includes a plurality of turbine buckets 62 that are each coupled to a rotor disk 64 such that each turbine bucket 62 extends radially outwardly from rotor disk 64 and towards casing 56. Each turbine bucket 62 is coupled to rotor disk 64 and is circumferentially-spaced about rotor disk 64. Adjacent rotor disks 64 are coupled together such that a gap 66 is defined between each adjacent row 68 of circumferentially-spaced turbine buckets 62. Nozzle assemblies 54 are spaced circumferentially about each rotor disk 64 between adjacent rows 68 of turbine buckets 62 to channel a working fluid towards turbine buckets 62. A working fluid flow path 70 is defined between turbine casing 56 and each rotor disk 64.

During operation, a working fluid is channeled to turbine 16 from a fluid source, for example, a power boiler (not shown), wherein working fluid thermal energy is converted to mechanical rotational energy by turbine 16, and subsequently electrical energy by generator 18. More specifically, steam is channeled through HP section 22 from HP steam inlet 40 and into working fluid flow path 70 to impact rotor assembly 20 to induce rotation of rotor assembly 20 about axis 46. Steam exits HP section 22 and is channeled to a boiler (not shown) that increases a temperature of the steam to a temperature that is approximately equal to a temperature of steam entering HP section 22. Steam is then channeled to IP steam inlet 42 and to IP section 24 at a reduced pressure compared to a pressure of the steam entering HP section 22. The steam impacts the rotor assembly 20 that is positioned within IP section 24 to induce rotation of rotor assembly 20.

In the exemplary embodiment, central section 38 includes a stator casing 72 that extends between HP section 22 and IP section 24. Stator casing 72 extends circumferentially about rotor assembly 20 between HP steam inlet 40 and IP steam inlet 42. Stator casing 72 includes a radially inner surface 74 that defines a cavity 76 therein. Rotor 44 is positioned within cavity 76, and includes an outer surface 78 that is spaced radially inwardly from stator inner surface 74. In the exemplary embodiment, turbine 16 includes a plurality of sealing assemblies 80 that extend radially inwardly from a turbine static shell, i.e. stator casing 72 to facilitate preventing working fluid leakage across rotor outer surface 78 and between rotor 44 and stator casing 72. Each sealing assembly 80 is coupled to stator casing 72 such that rotor 44 rotates relative to each sealing assembly 80. Stator casing 72 may also be referred to herein as a "stationary component." In the exemplary embodiment, at least one sealing assembly 80 includes a compliant plate seal assembly 12 that is coupled to stator casing 72, and is oriented between stator casing 72 and rotor 44. Compliant plate seal assembly 12 is oriented with respect to rotor 44 to form a tortuous path 82 between compliant plate seal assembly 12 and rotor 44 to facilitate reducing axial working fluid leakage between stator casing 72 and rotor 44. More specifically, compliant plate seal assembly 12 is configured to generate a differential pressure across compliant plate seal assembly 12 between an upstream region 84, and a downstream region 86, wherein upstream region 84 includes a higher fluid pressure than downstream region 86.

In the exemplary embodiment, sealing assembly 80 also includes a plurality of rotor lands 88 defined along rotor outer surface 78. Each rotor land 88 extends circumferentially about rotor outer surface 78 to facilitate forming tortuous path 82 to reduce a working fluid leakage flow between seal assembly 80 and rotor 44. Adjacent rotor lands 88 are spaced axially apart along rotor axis 46. In the exemplary embodiment, one or more rotor lands 88 includes a projection 90 that extends outwardly from rotor outer surface 78 towards stator casing 72. Each projection 90 extends a radial distance 92 outwardly from outer surface 78. In the exemplary embodiment, radial distance 92 of each rotor land 90 is approximately equal. Alternatively, radial distance 92 of each rotor land 90 may vary along rotor axis 46. Compliant plate seal assembly 12 is oriented with respect to rotor lands 88 such that tortuous path 82 is defined between compliant plate seal assembly 12 and rotor lands 88.

In the exemplary embodiment, compliant plate seal assembly 12 includes a support ring 94, a plurality of plate members 96 coupled to support ring 94, and a resistance member assembly 98 coupled to support ring 94 and extending through each plate member 96. Support ring 94 extends between an upstream surface 100 and a downstream surface 102 along centerline axis 46. Support ring 94 is coupled to stator casing 72 to support each plate member 96 and resistance member assembly 98 from stator casing 72. In the exemplary embodiment, stator casing 72 includes a dovetail groove 104 that is defined within stator casing inner surface 74, and is oriented circumferentially about rotor 44. Stator groove 104 is sized and shaped to receive support ring 94 such that support ring 94 is positioned within groove 104.

Stator groove 104 is defined by an interior surface 106 that extends axially between a first axial inner surface 108 and a second axial inner surface 110. First and second axial surfaces 108 and 110 extend radially inwardly from stator inner surface 74 to interior surface 106. In the exemplary embodiment, support ring 94 includes a first bearing hook 112 and a second bearing hook 114. Each bearing hook 112 and 114 facilitates preventing support ring 94 from moving radially outwardly with respect to stator casing 72. More specifically, first bearing hook 112 extends outwardly from upstream surface 100 towards first axial inner surface 108, and second bearing hook 114 extends outwardly from downstream surface 102 towards second axial inner surface 110.

Stator casing 72 includes a pair of bearing flanges 116 that at least partially define groove 104. An upstream bearing flange 118 extends outwardly from first axial inner surface 108 towards first bearing hook 112. A downstream bearing flange 120 extends outwardly from second axial inner surface 110 towards second bearing hook 114. Bearing hooks 112 and 114 each engage respective bearing flanges 118 and 120 to facilitate securely coupling support ring 94 to stator casing 72.

In the exemplary embodiment, compliant plate seal assembly 12 also includes at least one biasing member 122 coupled between support ring 94 and stator casing 72. Biasing member 122 is coupled between support ring 94 and stator casing 72 to bias compliant plate seal assembly 12 away from rotor 44. Biasing member 122 may be, for example, a coil spring, a leaf spring, and/or any other biasing mechanism that enables sealing assembly 80 to function as described herein. Moreover, in the exemplary embodiment, biasing member 122 is oriented to bias support ring 94 radially away from rotor 44 when there is no differential pressure, and to move support ring 94 radially towards rotor 44 when a differential pressure overcomes a biasing force of each biasing member 122. Such a support ring 94 may be referred to as a "variable clearance positive pressure packing" type ring. In the exemplary embodiment, compliant plate seal assembly 12 includes a first biasing member 124 coupled between first bearing hook 112 and upstream bearing flange 118, and a second biasing member 126 coupled between second bearing hook 114 and downstream bearing flange 120. Alternatively, compliant plate seal assembly 12 may not include biasing member 122, and support ring 94 may be rigidly coupled to stator casing 72.

In the exemplary embodiment, each plate member 96 includes a first side surface 128, an opposite second side surface 130, and a plate thickness $T_1$ defined between first side surface 128 and second side surface 130. First side surface 128 and second side surface 130 extend between a leading edge 132 and trailing edge 134 along a longitudinal axis 136. In addition, first side surface 128 and second side surface 130 extend radially outwardly from a root end 138 towards a tip end 140. Root end 138 is coupled to support ring 94. Tip end 140 extends outwardly from root end 138, and is oriented adjacent to rotor outer surface 78. Moreover, each plate member 96 is oriented with respect to rotor 44 such that each first side surface 128 and second side surface 130 is oriented along rotor axis 46, and trailing edge 134 is spaced downstream from leading edge 132 along centerline axis 46.

In the exemplary embodiment, root end 138 and tip end 140 extend between leading edge 132 and trailing edge 134. Tip end 140 includes a length $L_1$ measured between leading edge 132 and trailing edge 134 along longitudinal axis 136. In the exemplary embodiment, compliant plate seal assembly 12 is coupled to stator casing 72 such that tip end 140 extends across at least one rotor land 88. In one embodiment, compliant plate seal assembly 12 is coupled to stator casing 72 such that tip end 140 extends across two or more rotor lands 88. In addition, compliant plate seal assembly 12 may be oriented with respect to rotor 44 such that leading edge 132 and/or trailing edge 134 is oriented between adjacent rotor lands 88 (shown in FIG. 6). Alternatively, compliant plate seal assembly 12 may be oriented with respect to rotor 44 such that leading edge 132 and/or trailing edge 134 is oriented with respect to a rotor land 88 (shown in FIG. 5).

In the exemplary embodiment, adjacent plate members 96 are oriented in a facing relation (i.e., face-to-face). As used herein, the term "facing relation" refers to an orientation in which a first side surface 128 of a compliant plate member 96 is adjacent to a second side surface 130 of an immediate adjacent compliant plate member 96. In the exemplary embodiment, each side surface 128 and 130 is substantially planar. Alternatively, each side surface 128 and 130 may be concave, convex, and/or any other shape that enables sealing assembly 80 to function as described herein.

In the exemplary embodiment, each plate member 96 is coupled to support ring 94 such that a gap 142 is defined between adjacent compliant plate members 96. Gap 142 includes a varying thickness $T_2$ defined between adjacent side surfaces 128 and 130. In one embodiment, adjacent first and second sides 128 and 130 converge from root end 138 towards tip end 140 such that gap 142 is wider at root end 138 than at tip end 140. As such, root ends 138 of plate members 96 may be considered to be "loosely packed," and tip ends 140 may be considered to be "tightly packed." The term "tightly packed," as used herein, refers to an orientation in which adjacent plate tip ends 140 are not in contact with each other but are closely spaced, for example, but not limited to, being spaced by approximately 0.2 mils. In another embodiment, adjacent first and second sides 128 and 130 may diverge from root end 138 to tip end 140 such that gap 142 is wider at tip end 140 than at root end 138. Alternatively, adjacent member 96 may be oriented such that gap thickness $T_2$ is substantially constant from root end 138 to tip end 140. In addition, plate thickness $T_1$ may vary from root end 138 to tip end 140 such that gap 142 includes a varying gap thickness $T_2$.

Plate members 96 are coupled to support ring 94 such that each plate member 96 is oriented at an angle θ (also referred to herein as a "cant angle") relative to a respective tangent plane 144 of rotor 44. The tangent plane 144 is defined at a line 146 on rotor outer surface 78 that is proximate to plate tip end 140. More specifically, at least one of side surfaces 128 and/or 130 is oriented at angle θ relative to tangent plane 144. In the exemplary embodiment, cant angle θ is less than 90°. In one embodiment, cant angle θ is between approximately 30° and approximately 60°. In the exemplary embodiment, the cant angle θ is selected to ensure that plate members 96 are angled away from a direction R of rotation of rotor 44 such that the cant angle θ facilitates rotation of rotor 44 within sealing assembly 80.

In the exemplary embodiment, resistance member assembly 98 extends at least partially through each compliant plate member 96, and facilitates preventing axial leakage flow between gaps 142 along rotor axis 46. More specifically, in the exemplary embodiment, resistance member assembly 98 extends circumferentially about support ring 94, and extends radially inwardly from support ring 94 towards rotor 44. In the exemplary embodiment, each compliant plate member 96 includes at least one slot 148 that is sized and shaped to receive resistance member assembly 98 therethrough. Slot 148 extends through plate member 96 between first side surface 128 and second side surface 130, and extends from root end 138 towards tip end 140. In the exemplary embodiment, resistance member assembly 98 includes at least one annular resistance ring 150 that is coupled to support ring 94 and extends through each slot 148.

In the exemplary embodiment, each plate member 96 is configured to bend and flex with respect to support ring 94 to enable tip end 140 to move with respect to root end 138 during operation of rotor 44. More specifically, each plate member 96 includes an elasticity that enables each member tip end 140 to move outwardly away from rotor outer surface 78 as a tangential pressure build-up effect is generated across rotor outer surface 78 during a rotation of rotor 44. Such an effect causes compliant plate members 96 to lift during rotor rotation. As a result of this lift, in addition to other pressure forces induced to compliant plate members 96, and the inherent natural elasticity of compliant plate members 96, an equilibrium state is attained for each compliant plate member 96 that facilitates reducing a clearance 152 between plate tip ends 140 and rotor outer surface 78. In addition, resistance member assembly 98 facilitates channeling the leakage flow through tortuous path 82, thereby increasing the resistance of compliant plate seal assembly 12 to leakage flow in an axial direction. The reduced clearance 152 between the tip ends 140 and rotor 44 facilitates reducing frictional heat generation by substantially minimizing or eliminating physical contact between plate tip ends 140 and rotor 44.

Figure 6:
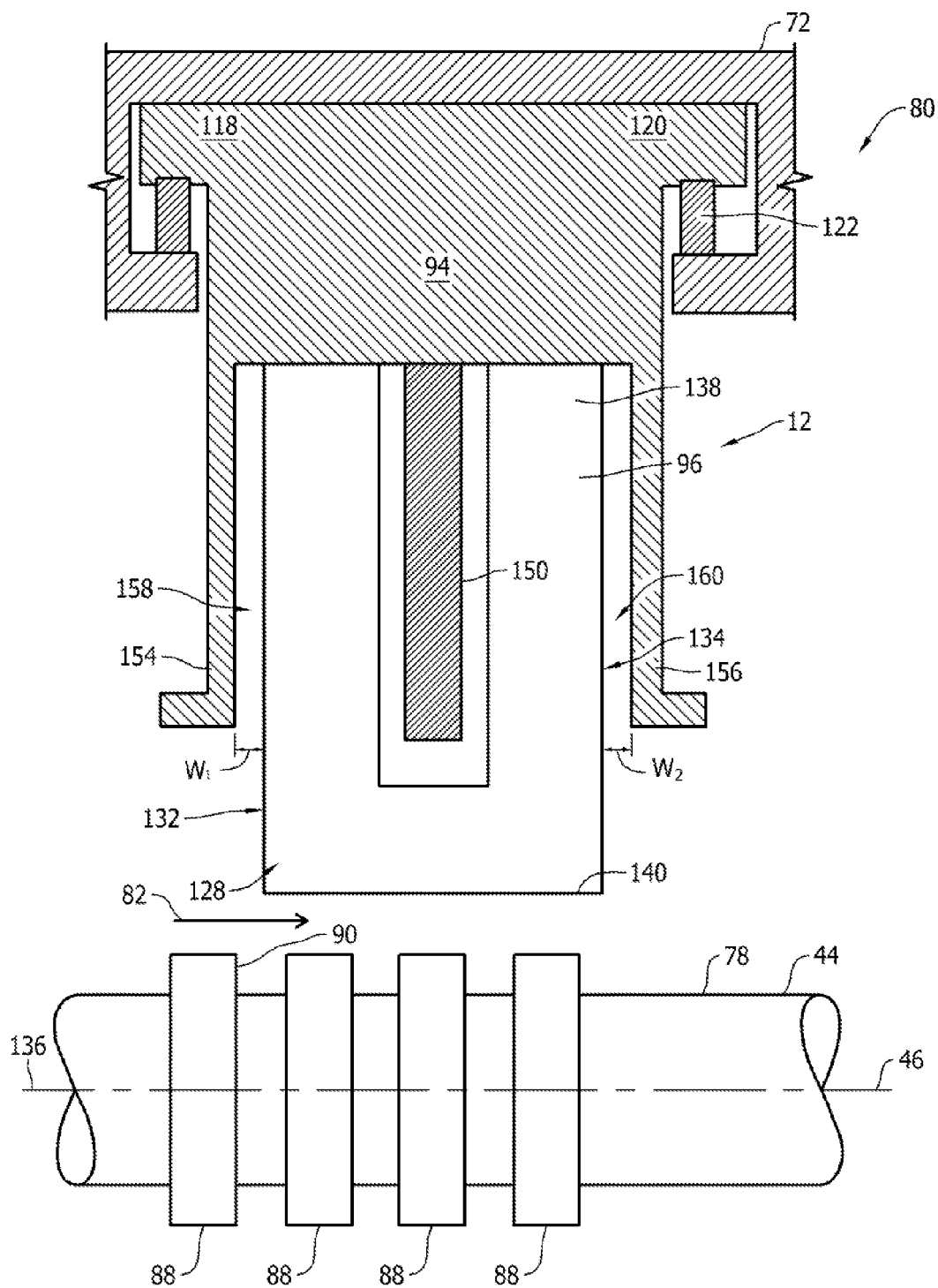
FIGS. 6 and 7 are sectional views of alternative embodiments of the compliant plate seal assembly shown in FIG. 5.
Figure 7:
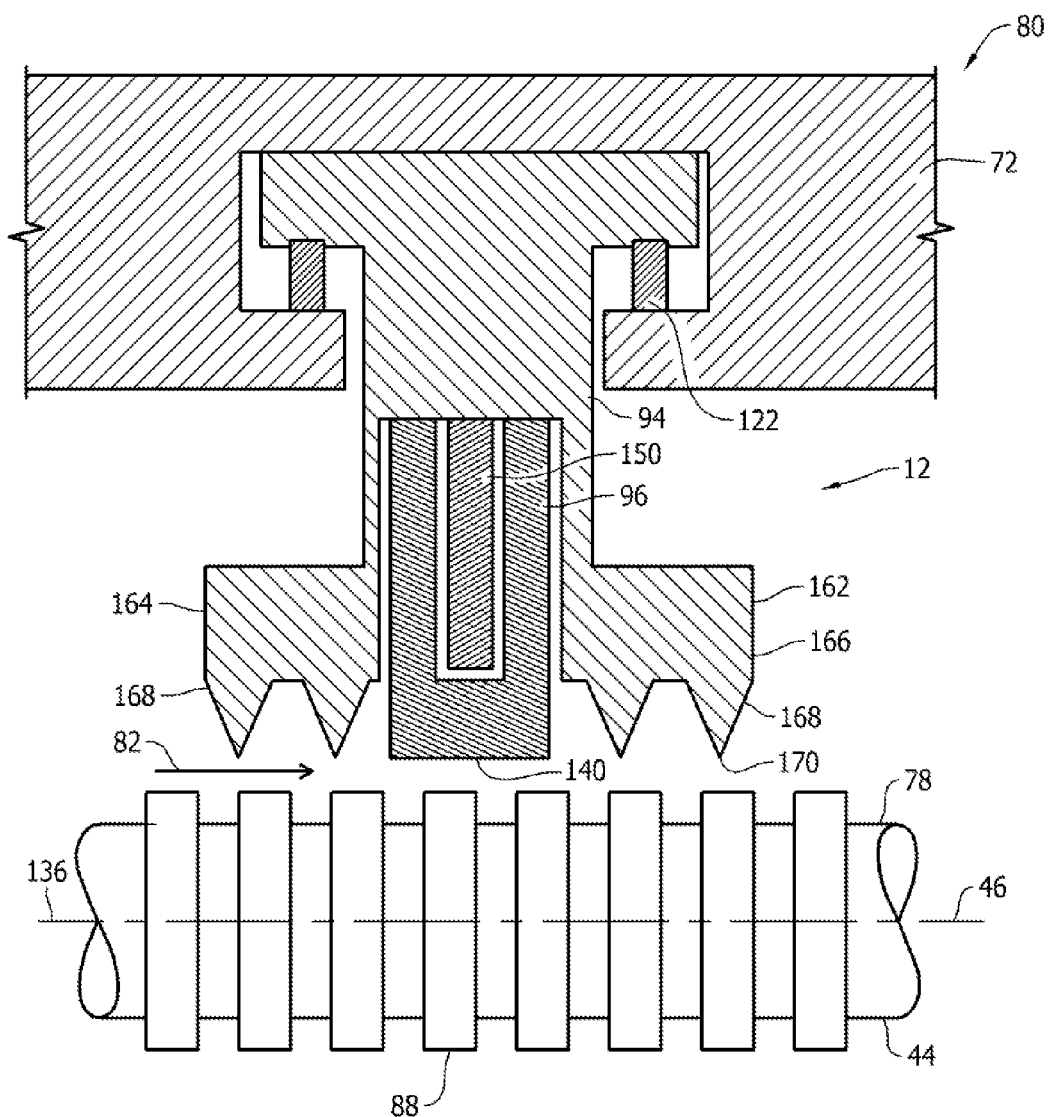

FIGS. 6 and 7 are sectional views of alternative embodiments of compliant plate seal assembly 12. Identical components shown in FIGS. 6 and 7 are labeled with the same reference numbers used in FIG. 5. Referring to FIG. 6, in the exemplary embodiment, compliant plate seal assembly 12 includes an upstream resistance ring 154 and a downstream resistance ring 156. Upstream resistance ring 154 extends radially inwardly from support ring 94 towards rotor 44, and extends circumferentially across member leading edge 132. Downstream resistance ring 156 extends inwardly from support ring 94 towards rotor 44, and is spaced axially from upstream resistance ring 154 along plate longitudinal axis 136. Downstream resistance ring 156 extends circumferentially across member trailing edge 134 such that upstream and downstream resistance rings 154 and 156 substantially enclose plate members 96. Upstream resistance ring 154 is oriented with respect to leading edge 132 such that a first gap 158 having a first width $W_1$ is defined between upstream resistance ring 154 and leading edge 132. Downstream resistance ring 156 is oriented with respect to trailing edge 134 such that a second gap 160 having a second width $W_2$ is defined between downstream resistance ring 156 and trailing edge 134. In the exemplary embodiment, first width $W_1$ is approximately equal to second width $W_2$. Alternatively, first width $W_1$ may be less than, or greater than, second width $W_2$.

Referring to FIG. 7, in one embodiment, compliant plate seal assembly 12 includes one or more labyrinth teeth assemblies 162 that extend outwardly from support ring 94 towards rotor outer surface 78. More specifically, compliant plate seal assembly 12 includes an upstream labyrinth teeth assembly 164 that extends outwardly from upstream resistance ring 154, and a downstream labyrinth teeth assembly 166 that extends outwardly from downstream resistance ring 156. Each labyrinth teeth assembly 162 includes a plurality of labyrinth teeth 168 that extend towards rotor outer surface 78 to at least partially define tortuous path 82. In the exemplary embodiment, labyrinth teeth 168 are oriented such that plate tip end 140 is positioned closer to rotor outer surface 78 than a tip 170 of labyrinth teeth 168. Alternatively, plate tip end 140 and labyrinth teeth tip 170 may be substantially coplanar.

The above-described seal assembly creates a high-pressure dynamic seal between a rotating component and a static component. The seal assembly includes a compliant plate seal assembly that forms a tortuous flow path between the compliant plate seal assembly and a rotor assembly to facilitate preventing leakage between the rotor assembly and the compliant plate seal assembly. More specifically, the seal assembly includes a plurality of rotor lands that are oriented circumferentially about an outer surface of the rotor assembly. By providing a sealing assembly that includes a compliant plate seal assembly oriented with respect to a plurality of rotor lands, a leakage flow between the rotor assembly and the compliant plate seal assembly is reduced, thereby increasing an operating efficiency of the turbomachine.

Exemplary embodiments of a compliant plate seal assembly for use with rotating machines and methods of assembling a rotating machine are described above in detail. The compliant plate seal assemblies described herein are not limited to the specific embodiments described herein, but rather, components of the compliant plate seal assemblies may be utilized independently and separately from other components described herein. For example, the compliant plate seal assemblies may be used in combination with other rotary machines, and are not limited to being used with only the rotating machine and operations thereof, as described herein. Rather, the sealing assembly can be implemented and utilized in connection with many other sealing applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sealing assembly for use with a rotating machine, the rotating machine including a stator casing including a radially inner surface that defines a cavity therein, and a rotor positioned within the cavity and spaced inwardly from the stator inner surface, said sealing assembly comprising:
   a support ring coupled to the stator casing;
   a plurality of plate members coupled to said support ring and oriented circumferentially about the rotor, each plate member of said plurality of plate members comprising a root end and a tip end, said root end coupled to said support ring, said tip end extending outwardly from said root end towards an outer surface of the rotor;

a resistance member coupled to said support ring and extending inwardly from said support ring towards the rotor outer surface, said resistance member extending through said each plate member of said plurality of plate members; and a plurality of rotor lands defined circumferentially about the rotor outer surface, said tip end of said each plate member of said plurality of plate members oriented adjacent said plurality of rotor lands to form a high-pressure dynamic seal comprising a tortuous flow path between said plurality of rotor lands and said plurality of plate members to channel an axial leakage flow between said plurality of rotor lands and said plurality of plate members through said tortuous flow path and thereby reduce said axial leakage flow.

2. A sealing assembly in accordance with claim 1, wherein said each plate member of said plurality of plate members further comprises a slot extending from the root end towards the tip end, said slot configured to receive said resistance member therein.

3. A sealing assembly in accordance with claim 1, wherein each of said plurality of rotor lands comprises a projection that extends radially outwardly from the rotor outer surface.

4. A sealing assembly in accordance with claim 1, further comprising at least one biasing member coupled to said support ring and the stator casing.

5. A sealing assembly in accordance with claim 1, wherein said each plate member of said plurality of plate members comprises a leading edge and a trailing edge, said tip end extending between said leading edge and said trailing edge and comprising a length measured between said leading edge and said trailing edge, said tip end extending axially across each of said plurality of rotor lands.

6. A sealing assembly in accordance with claim 5, wherein said tip end extending across two or more of said plurality of rotor lands.

7. A sealing assembly in accordance with claim 1, wherein the stator casing includes a groove defined along the stator inner surface, said support ring positioned within the groove such that said support ring extends circumferentially about the rotor.

8. A sealing assembly in accordance with claim 7, further comprising a plurality of labyrinth teeth coupled to said support member and oriented adjacent the rotor outer surface.

9. A rotating machine comprising:
a stator casing including a radially inner surface that defines a cavity therein;
a rotor coupled to said stator casing, said rotor comprising a radially outer surface that is spaced inwardly from the stator inner surface; and
a sealing assembly oriented between said stator casing and said rotor outer surface, said sealing assembly comprising:
a support ring coupled to said stator casing;
a plurality of plate members coupled to said support ring and oriented circumferentially about said rotor outer surface, each plate member of said plurality of plate members comprising a root end and a tip end, said root end coupled to said support ring, said tip end extending outwardly from said root end towards said rotor outer surface;
a resistance member coupled to said support ring and extending inwardly from said support ring towards the rotor outer surface, said resistance member extending through said each plate member of said plurality of plate members; and
a plurality of rotor lands circumferentially about said rotor outer surface, said tip end of said each plate member of said plurality of plate members oriented adjacent said plurality of rotor lands to form a high-pressure dynamic seal comprising a tortuous flow path between said plurality of rotor lands and said plurality of plate members to channel an axial leakage flow between said plurality of rotor lands and said plurality of plate members through said tortuous flow path and thereby reduce said axial leakage flow.

10. A rotating machine in accordance with claim 9, wherein said each plate member of said plurality of plate members further comprises a slot extending from the root end towards the tip end, said slot configured to receive said resistance member therethrough.

11. A rotating machine in accordance with claim 9, wherein each of said plurality of rotor lands comprises a projection that extends radially outwardly from said rotor outer surface.

12. A rotating machine in accordance with claim 9, wherein said sealing assembly further comprises at least one biasing member coupled to said support ring and the stator casing.

13. A rotating machine in accordance with claim 9, wherein said each plate member of said plurality of plate members comprises a leading edge and a trailing edge, said tip end extending between said leading edge and said trailing edge and comprising a length measured between said leading edge and said trailing edge, said tip end extending axially across each of said plurality of rotor lands.

14. A rotating machine in accordance with claim 13, wherein said tip end extending across two or more of said plurality of rotor lands.

15. A rotating machine in accordance with claim 9, wherein said stator casing includes a groove defined along said stator inner surface, said support ring positioned within said groove such that said support ring extends circumferentially about said rotor.

16. A rotating machine in accordance with claim 9, wherein said sealing assembly further comprises a plurality of labyrinth teeth coupled to said support member and oriented adjacent said rotor outer surface.

* * * * *